United States Patent
Girardon et al.

(10) Patent No.: US 9,874,179 B2
(45) Date of Patent: Jan. 23, 2018

(54) VALVE WITH TWO FLAPS PLACED SERIALLY AND ACTUATED BY A COMMON MOTOR

(71) Applicant: Valeo Systemes de Controle Moteur, Cergy Saint Christophe (FR)

(72) Inventors: Franck Girardon, Conflans Sainte Honorine (FR); Mathieu Lallemant, Maisons-Laffitte (FR); Patrick Lebrasseur, Montagny en Vexin (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 0 days.

(21) Appl. No.: 14/650,963

(22) PCT Filed: Dec. 12, 2013

(86) PCT No.: PCT/FR2013/053051
§ 371 (c)(1),
(2) Date: Jun. 10, 2015

(87) PCT Pub. No.: WO2014/091164
PCT Pub. Date: Jun. 19, 2014

(65) Prior Publication Data
US 2015/0330336 A1 Nov. 19, 2015

(30) Foreign Application Priority Data
Dec. 12, 2012 (FR) .................................. 12 61933

(51) Int. Cl.
*F16K 11/14* (2006.01)
*F02M 25/07* (2006.01)
(Continued)

(52) U.S. Cl.
CPC ..... *F02M 25/0796* (2013.01); *F02B 29/0418* (2013.01); *F02M 26/71* (2016.02);
(Continued)

(58) Field of Classification Search
USPC ........................................ 137/630.19; 251/77
See application file for complete search history.

(56) References Cited

U.S. PATENT DOCUMENTS 2,061,166 A * 11/1936 Mueller ................. F02M 21/00
123/586
3,058,488 A * 10/1962 Algernon ................. B03B 5/24
137/596

(Continued)

FOREIGN PATENT DOCUMENTS

FR 2 900 455 A1 11/2007

OTHER PUBLICATIONS

International Search Report issued in corresponding PCT Application No. PCT/FR2013/053051 dated May 16, 2014 (4 pages).

*Primary Examiner* — John Fox
(74) *Attorney, Agent, or Firm* — Osha Liang LLP

(57) ABSTRACT

The invention pertains to a three-way valve (1), particularly one intended to be used in an air intake circuit of a motor vehicle, comprising: a body (200) delimiting a first (2), a second (3), and a third (4) conduit, said conduits opening into a shared inner space (201), a first flap (21) capable of being moved to obstruct the first conduit, a second flap (20) capable of being moved to selectively obstruct either the second or the third conduit, a single actuator being arranged to selectively move at least one of the first and second flaps.

10 Claims, 6 Drawing Sheets

Figure 1:
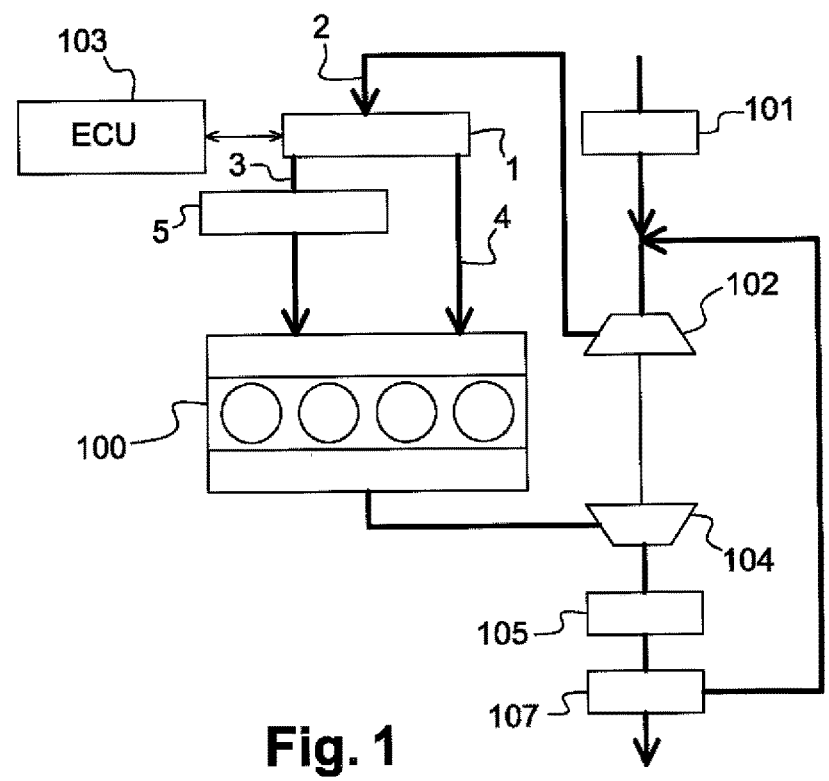

(51) Int. Cl.
*F16K 11/18* (2006.01)
*F16K 31/04* (2006.01)
*F16K 1/22* (2006.01)
*F02M 35/10* (2006.01)
*F02B 29/04* (2006.01)
*F02M 26/71* (2016.01)

(52) U.S. Cl.
CPC ....... *F02M 35/10255* (2013.01); *F16K 1/221* (2013.01); *F16K 1/223* (2013.01); *F16K 11/18* (2013.01); *F16K 31/04* (2013.01); *Y02T 10/146* (2013.01); *Y10T 137/86855* (2015.04)

(56) References Cited

U.S. PATENT DOCUMENTS

| | | | | |
|---|---|---|---|---|
| 4,749,004 | A * | 6/1988 | Peash | B64D 13/00 |
| | | | | 137/865 |
| 4,921,598 | A * | 5/1990 | Desch | C02F 1/42 |
| | | | | 137/599.15 |
| 7,128,038 | B2 * | 10/2006 | Kawai | F02D 9/1035 |
| | | | | 123/184.21 |
| 8,316,830 | B2 * | 11/2012 | Keefover | F02D 9/1035 |
| | | | | 123/568.21 |
| 8,684,033 | B2 * | 4/2014 | Albert | F02B 29/0418 |
| | | | | 137/601.11 |
| 2005/0028796 | A1 | 2/2005 | Tussing et al. | |
| 2010/0206274 | A1 | 8/2010 | Furukawa et al. | |
| 2012/0145134 | A1 | 6/2012 | Miyazaki et al. | |

* cited by examiner

VALVE WITH TWO FLAPS PLACED SERIALLY AND ACTUATED BY A COMMON MOTOR

The invention relates to a valve which is intended, for example, to be used in an air intake circuit of a heat engine and particularly in an air intake circuit of a diesel engine.

Such an air intake circuit comprises in known manner a cooled path and a non-cooled path, which is further known as a bypass path, the function thereof being to branch off the cooled path. Those two paths are controlled by one or more valves which allow, on the one hand, the metering of the quantity of air which is introduced into the motor and, on the other hand, the selection of the path, cooled or non-cooled, which is taken by the intake air. Those two paths can subsequently join each other at the inlet of the heat engine.

A first known type of arrangement of an air intake circuit which is described in FR2900455 is constituted by a three-way valve which comprises two independent valve members which are mounted in a parallel manner, each valve member allowing control of the flow of air flowing in the path in which it is mounted. For reasons of safety and in order to prevent the motor from becoming jammed, each valve member must be provided with a position sensor, each of the valve members being able to be closed completely. Furthermore, since each valve member can be the seat of a leak, the mounting in a parallel manner increases the risk factor of a leak at the valve.

Another known type of arrangement of an air intake circuit is constituted by a first metering valve which is mounted in series with a second bypass valve, the first valve serving to meter the air which flows in the intake circuit and the second valve serving to select the path taken by the intake air. As a result, there is a large spatial requirement and a high level of complexity which is connected with the control of two different components.

A last known type of arrangement of an air intake circuit is constituted by a first metering valve which is mounted on the cooled path and a second metering valve which is mounted on the non-cooled path. As a result, there is a high risk of leakage connected with the presence of two valves which are mounted in a parallel manner. This type of arrangement involves a large spatial requirement and a high level of complexity which is connected with the control of two different components.

There is a need for an arrangement of an air intake circuit of a thermal motor which is constituted by a single valve having the twin function of metering the intake air and selecting the path taken by the intake air. An object of the invention is to provide an arrangement of an intake circuit which is simple, reliable and economical.

To this end, there is provided according to the invention a three-way valve, in particular intended to be used in an air intake circuit of a motor vehicle, comprising:
  a body delimiting a first conduit, second conduit and third conduit, the conduits opening in a common internal space,
  a first valve member which is capable of being moved in order to control the flow of fluid flowing in the first conduit,
  a second valve member which is capable of being moved in order to control the flow of fluid flowing in the second and third conduits,
  a single actuator which is arranged in order to selectively move at least one of the first and second valve members.

There is further provided according to the invention a three-way valve, in particular intended to be used in an air intake circuit of a motor vehicle, comprising:
  a body delimiting a first conduit, second conduit and third conduit, the conduits opening in a common internal space,
  a first valve member which is capable of being moved in order to close the first conduit,
  a second valve member which is capable of being moved in order to selectively close one or other of the second and third conduits,
  a single actuator which is arranged in order to selectively move at least one of the first and second valve members.

In this manner, the second valve member is capable of being moved in order to close the second conduit when the valve member is in a first position and in order to close the third conduit when the valve member is in a second position which is different from the first position.

In accordance with the present application, a conduit is closed when the cross-section of flow in that conduit in the region of the valve member is at a minimum, for example, to within the level of leaks. For example, when the conduit is closed, the valve member extends perpendicularly to the wall of the conduit in the region in which it is arranged.

In such an arrangement, the first and second valve members are mounted in series which has the effect of limiting the risks connected with the existence of a leak in one of the valve members. The term "the first and second valve members are mounted in series" is intended to be understood to mean that, when the fluid flows in the first conduit toward one of the second and third conduits, it successively encounters the first valve member then the second valve member.

The two valve members are actuated by a single actuator, which allows a more compact and less expensive valve to be provided.

When the valve is used in an air intake circuit of a motor vehicle, the first conduit is preferably connected to the air inlet, the second and third conduits then form a portion of the cooled path and the non-cooled path, respectively.

Preferably, the first valve member is arranged in the first conduit.

By being moved, the first valve member can close the cross-section of flow in the first conduit in the region of the valve member.

Preferably, the second valve member is arranged in the common internal space.

By being moved, the second valve member can close the cross-section of flow in one or other of the second and third conduits in the region of the valve member, respectively.

Preferably, the actuator is a direct-current electric motor.

According to a first embodiment, the valve comprises a first transmission wheel which is arranged in order to carry the first valve member and a second transmission wheel which is arranged in order to carry the second valve member, respectively.

Advantageously, the actuator comprises an actuation wheel which is arranged in order to carry directly one of the first and second transmission wheels and indirectly the other of the first and second transmission wheels.

In a specific embodiment, the actuation wheel is arranged in order to directly or indirectly carry the second transmission wheel and to carry indirectly the first transmission wheel via at least the second transmission wheel.

Advantageously, the valve is configured in such a manner that, from a rest state of the first and second valve members, a rotation in a first rotation direction of the actuation wheel brings about a movement of the first valve member without moving the second valve member.

In an embodiment, the first and second valve members are in the rest state when the first valve member is in such a position that the first conduit is open and when the second valve member is in such a position that one of the second and third conduits is closed and the other of the second and third conduits is open.

In accordance with the present application, a conduit is open when the cross-section of flow in that conduit in the region of the valve member is at a maximum. For example, when the conduit is open, the valve member extends parallel with the wall of the conduit in the region in which it is arranged.

In an application in the intake circuit of a heat engine, the valve may be configured so that, when the valve members are in the rest state, the intake circuit is open in the cooled path.

The valve members and the transmission wheels may be arranged in such a manner that the rotation of a wheel does not systematically move the valve member which it controls. In this manner, a rotation in a first direction of the actuation wheel may bring about a movement of the first valve member without moving the second valve member although this rotation moves the second wheel.

Such an arrangement of one of the first and second transmission wheels allows the corresponding valve member to be moved only over a portion of the rotation thereof. That only partial use of the rotation of the first or second wheel in order to move the corresponding valve member is, for example, allowed as a result of a movable stop which will be mentioned below.

That rotation in the first rotation direction, from the rest state of the valve members, allows a metering operation at one of the second and third conduits to be carried out by the first valve member being moved.

Advantageously, the valve is configured in such a manner that, from the rest state of the first and second valve members, a rotation in a second rotation direction of the actuation wheel, counter to the first rotation direction, brings about a movement of the second valve member without moving the first valve member in accordance with a first step.

That first step has the effect of selecting from the second and third conduits the conduit to be placed in fluid communication with the common internal space of the valve.

Advantageously, the valve is configured in such a manner that the continuation of the rotation in the second rotation direction of the actuation wheel brings about a movement of the first valve member and the second valve member in accordance with a second subsequent step without the movement of the second valve member modifying the flow in the second conduit and third conduit.

Advantageously, the valve is configured in such a manner that the second subsequent step begins when the second valve member has reached a position in which it closes one of the second and third conduits.

That arrangement has the effect of allowing that second subsequent step to correspond to a metering operation in the conduit of the second and third conduits that is not closed by the second valve member at the end of the first step.

Advantageously, the second valve member defines a closure cross-section which is greater than the cross-section of flow in the second or third conduit in the region of the common internal space.

Preferably, the second valve member, the common internal space and the second and third conduits are arranged in order to allow the second valve member to be partially moved without the cross-section of flow in the second and third conduits being modified.

Such an arrangement allows the single actuator to simultaneously move the first and second valve members while acting only on the cross-section of flow of the first conduit.

Preferably, the common internal space is cylindrical with a circular base and the cross-section of flow of the common internal space toward the second and third conduits extends over an angular sector $\theta i$ which is measured from the axis of the cylinder and a height $hi$ which is measured along the axis of the cylinder, and the corresponding dimensions $\theta j$ and $hj$ of the valve member may be such that $\theta j > \theta i$ and/or $hj > hi$. The common internal space which is capable of receiving the valve member portion which does not cover the opening of the second or third conduit acts as an overlap zone.

Advantageously, the second valve member is a right circular cylinder whose base is defined by an angular sector, that cylinder extending along the rotation axis thereof, the axis extending via the peak of the angular sector.

Preferably, the second valve member is arranged so that the rotation axis thereof extends via the center of the circular base of the cylinder defining the common internal space.

Thus, the second valve member can be moved partially without that movement having any influence on the opening or closing of the second or third conduit. In the example above, when the valve member closes one of the conduits, the angular sector $\theta j - \theta i$ does not close the conduit, in such a manner that a rotation movement of the second valve member about an angle less than or equal to $\theta j - \theta i$ cannot affect the closure of a conduit.

According to an embodiment, at least one of the first valve member and the second valve member is/are fixedly joined to a shaft, the shaft being provided with a movable stop which is capable of being carried:
  by the first or second corresponding transmission wheel which is mounted so as to be free about the shaft, and
  by a return member.

Preferably, the return member is a torsion spring which is mounted around the shaft and which is biased by one of the two ends thereof on the body and the other of the two ends thereof on the body and on the movable stop.

Preferably, the two ends of the spring are biased at the same time on the body and on the movable stop.

Each of the first and second valve members may be configured in accordance with one or other of those two configurations.

For example, at least one of the first and second wheels may comprise at least one drive portion for the corresponding movable stop and at least one passive portion in which it does not carry the movable stop. The wheel may in particular comprise a plurality of drive portions which are distributed over the periphery of the wheel and those drive portions may be separated in pairs by a passive portion. For example, each drive portion extends over a radius of the wheel and each passive portion is formed by a recess between the drive portions.

Preferably, at least one of the two shafts is provided with a position sensor. For example, the shaft on which the first transmission wheel is mounted so as to be free is provided with a position sensor.

In a variant, at least one of the two transmission wheels is/are provided with a position sensor. For example, the first transmission wheel is provided with a position sensor.

Figure 2:
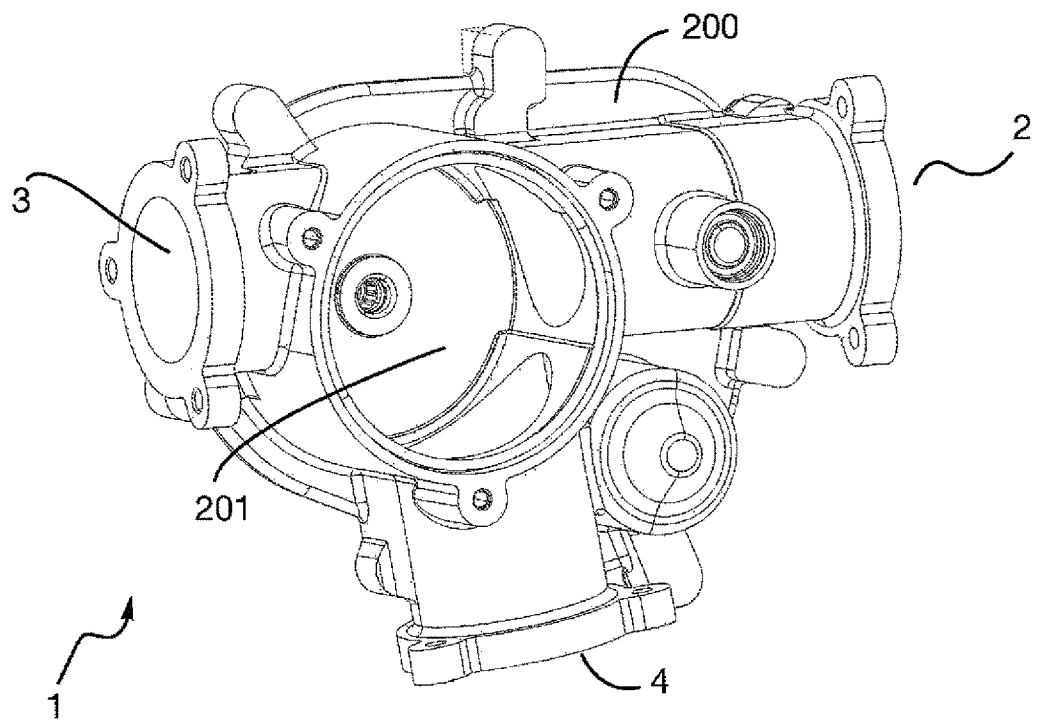
Figure 3:
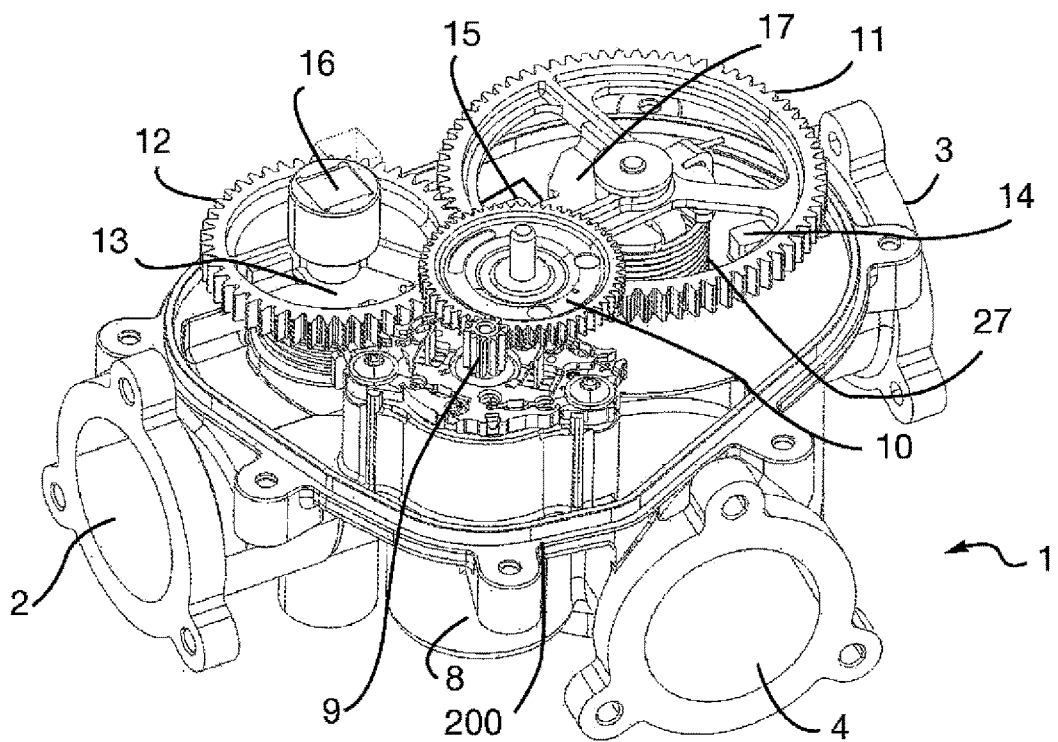
Figure 4:
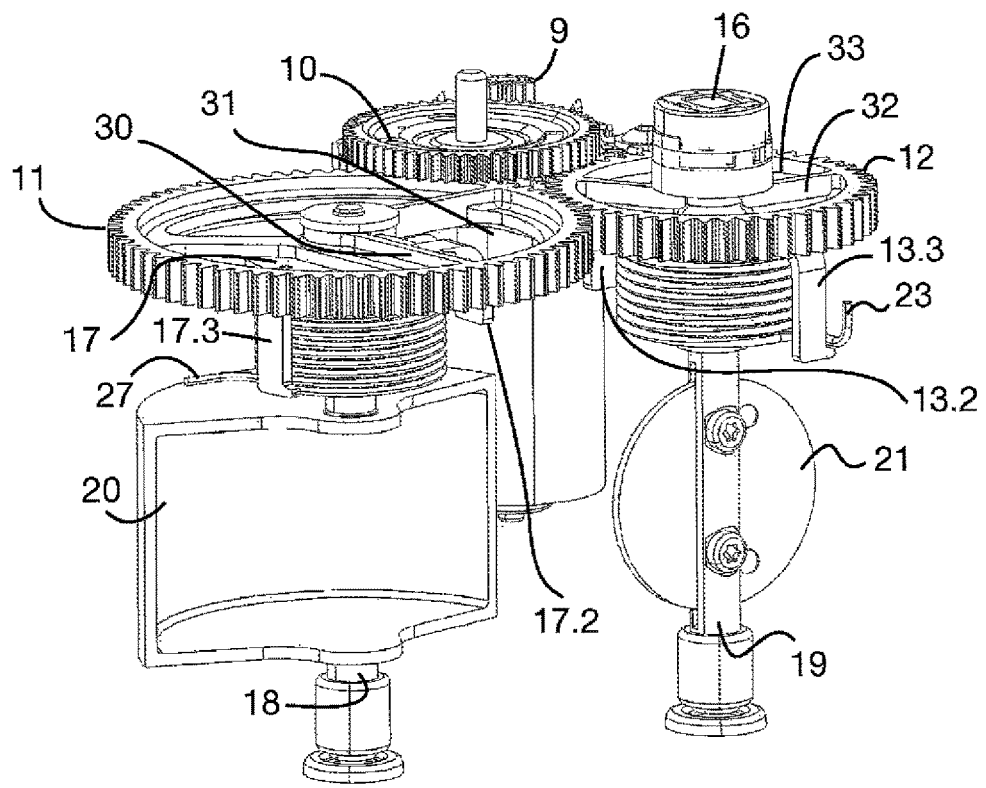
Figure 5:
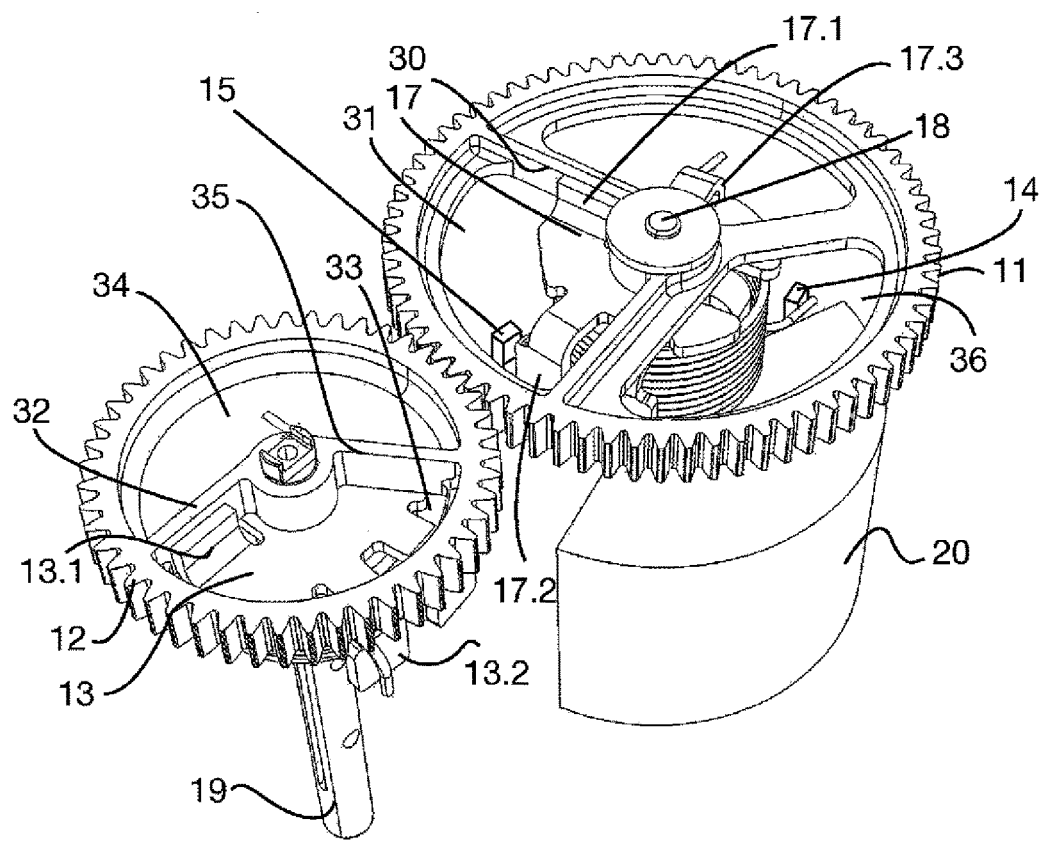
Figure 6:
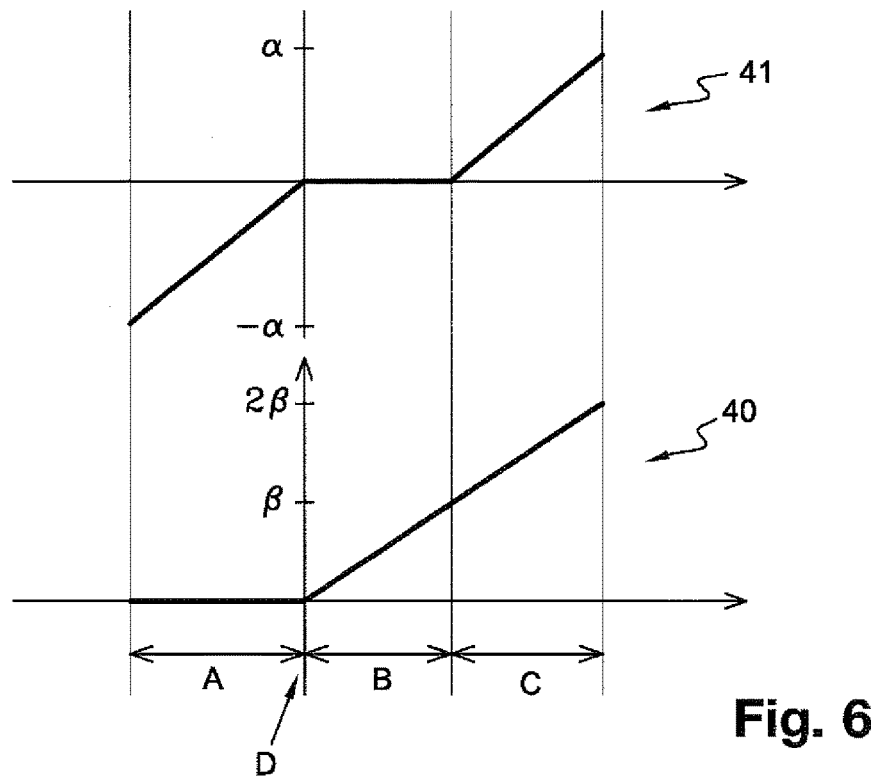

The invention may be better understood from a reading of the following detailed description of non-limiting embodiments of the invention and an examination of the appended drawings, in which:

FIG. 1 is a schematic illustration of a supply architecture of a turbocharged vehicle engine, FIG. 2 is a perspective bottom view of a valve body according to an embodiment of the invention, FIG. 3 is a perspective top view of a valve according to that embodiment of the invention, the cap of the valve not being illustrated, FIG. 4 is a perspective view of the internal components of a valve according to this embodiment of the invention, FIG. 5 is a detailed perspective view of the internal components of a valve according to this embodiment of the invention, FIG. 6 is an illustration of the displacement law of the first and second valve members in accordance with the voltage applied to the actuator of the valve, FIGS. 7 to 10 are schematic views in accordance with a linear representation of different states of the valve, FIGS. 11 to 14 are schematic top views of the valve according to this embodiment of the invention, illustrating the movement of the first and second valve members in accordance with the states of the valve according to FIGS. 7 to 10, respectively.

With reference to FIG. 1, there will be described an example of an environment in which there can be used a valve 1 according to an embodiment of the invention. FIG. 1 illustrates the air supply circuit of a turbocharged internal combustion engine for a motor vehicle 100. The air which is taken from the exterior passes into an air filter 101, then is compressed by the compressor 102 of the turbocharger which conveys it into the valve 1. The valve 1 has a first conduit 2 which here forms the inlet path 2 via which the air from the compressor passes, and a second conduit 3 and third conduit 4 which define here two outlet paths 3 and 4. The valve 1 receives instructions from a processor 103 which are carried out in the form of a movement of valve members which will be described below. The outlet path 3 which is referred to as the cooled path is connected to a heat exchanger or cooler 5, while the outlet path 4, referred to as the bypass path or non-cooled path, is connected directly to the internal combustion engine 100. At the outlet of the internal combustion engine, the burnt gases are directed toward the exhaust circuit and are introduced into the turbine 104 of the turbocharger which takes a portion of the residual energy thereof in order to actuate the corresponding compressor 102. Those exhaust gases subsequently conventionally pass through a particulate filter and/or a catalyst 105 before being discharged from the vehicle.

In the case of a low-pressure architecture, a portion of the exhaust gases is taken downstream of the turbine 104 and re-injected via a low-pressure valve 107, upstream of the compressor 102 of the turbocompressor. The fluid which flows in the intake circuit is not then only air but instead an admixture of air and exhaust gases.

FIG. 2 illustrates the body 200 of the valve 1. Each conduit 2 to 4 opens in a common internal space 201 via a cross-section of flow. In the example described, the cross-sections of flow are each in the form of a portion of the lateral surface of a cylinder whose circular base is formed by the bottom of the common internal space 201. Each cross-section of flow is here defined by an angular coordinate θi which is measured from the axis of the cylinder and a height hi which is measured along the axis. As illustrated in FIGS. 11 to 14, the cross-section of flow toward the conduit 4 is separated from the cross-section of flow toward the conduit 3 by the wall of the common internal space 201, that wall forming an overlap zone 202, as explained below.

FIG. 3 illustrates the body 200 of the valve 1, which body 200 receives a train of gears which is actuated by a direct-current electric motor 8. The electric motor causes, by means of the pivot axis 9 thereof, the rotation of an actuation wheel 10 which engages with a first transmission wheel 11, referred to as the "bypass wheel", which itself engages in turn with a second transmission wheel 12, referred to as the "metering wheel".

Now with reference to FIGS. 4 and 5, the detail of the train of gears and the structure having two valve members of the example described can be seen.

The metering wheel 12 is mounted so as to be free about a shaft 19, referred to as the "metering shaft". A movable stop 13 which is referred to as the movable metering stop is fixedly joined to that shaft and has a first projecting portion 13.1 in the direction of the metering wheel and a second projecting portion 13.2 and third projecting portion 13.3 in the opposite direction to that same wheel. An angular position sensor 16 (for example, a Hall sensor) is mounted on that shaft. A torsion spring 23 is mounted around that shaft, the two ends thereof each being in contact at the same time with the body of the valve by means of fixed stops (not illustrated) and with the second and third projecting portions of the movable metering stop.

A rest position is defined when the two ends of the spring 23 are in contact with the fixed stops. In this rest position, none of the second and third projecting portions of the movable stop biases one of the ends of the spring 23 in order to tend to move them in such a manner that they are no longer in contact with the body of the valve.

The movable metering stop 13 can be caused to rotate by the metering wheel, in each of the two rotation directions thereof and via the first projecting portion 13.1. When it is caused to rotate by the metering wheel, the movable metering stop biases the spring 23 by means of one of the second projecting portion 13.2 and third projecting portion 13.3 thereof. In the example described, the metering wheel 12 comprises a drive portion 32 (in this instance, a material bridge which is arranged over a radius of that metering wheel) of the projecting portion 13.1 of the movable metering stop 13, which causes the rotation of the movable metering stop 13 when the metering wheel rotates in the trigonometric direction from the rest position thereof, and a passive portion 33 (in this instance, a recess provided in the wheel over an angular sector) which does not cause the rotation of the movable metering stop when the metering wheel rotates in the inverse trigonometric direction from the rest position and in accordance with an angular sector which is at a maximum equal to that of the passive portion. The metering wheel 12 comprises another drive portion 35 of the projecting portion 13.1 of the movable metering stop 13 when the metering wheel rotates in the inverse trigonometric direction from the rest position and after the metering wheel has carried out an angle which is at a maximum equal to the angle defined by the angular sector of the passive portion 33. The two drive portions are distributed over the periphery of the metering wheel and separated in pairs by the passive portions 33 and 34.

In the rest position, the drive portion 32 is in contact with the projecting portion 13.1 of the movable metering stop 13. From the rest position, when the metering wheel 12 rotates in the trigonometric direction, the drive portion 32 causes the rotation of the projecting portion 13.1 of the movable metering stop 13, which results, on the one hand, in one of the ends of the spring 23 being biased via the projecting portion 13.3 and, on the other hand, the metering shaft 19 and therefore the metering valve member 21 being caused to rotate.

From that rest position, when the metering wheel 12 rotates in the inverse trigonometric direction, the drive portion 32 does not carry the projecting portion 13.1 of the movable metering stop 13. The passive portion 33 allows rotation of the metering wheel about an angle which is at a maximum equal to the angle of the angular sector of the passive portion, before the drive portion 35 moves into contact with the projecting portion 13.1. Continuation of the rotation of the metering wheel in the inverse trigonometric direction thus has the effect of carrying the projecting portion 13.1 of the movable metering stop 13 which results, on the one hand, in the other of the ends of the spring 23 being biased via the projecting portion 13.2 and, on the other hand, the metering shaft 19 and therefore the metering valve member 21 being caused to rotate.

When the metering wheel no longer applies any force to the projecting portion 13.1, either owing to a change in the rotation direction in relation to the direction which had the effect of leaving the rest position, or when the metering wheel becomes free in terms of rotation, following a lack of effort applied by the drive wheel, for example, the metering spring 23 tends to return to the rest position thereof and one or other of the ends thereof carries one or other of the projecting portions 13.2 or 13.3 until that end is in contact with the fixed stop with which it was in contact in the rest position.

In the example being considered, the metering valve member 21 is arranged in the conduit 2. That valve member is planar and is in the form of a disk. It extends at one side and the other of a portion of the shaft 19 and is arranged over the diameter thereof. It is moved in rotation about that shaft and thus moves within the conduit 2, this having the effect of closing that conduit to a greater or lesser extent.

The bypass wheel 11 is mounted so as to be free about a shaft 18, referred to as the "bypass shaft". A movable stop 17, referred to as the "movable bypass stop", is fixedly joined to that shaft and has a first projecting portion 17.1 in the direction of the bypass wheel and a second projecting portion 17.2 and third projecting portion 17.3 in the opposite direction to that same wheel. A torsion spring 27 is mounted around that shaft, the first of the two ends thereof being in contact with the body of the valve by means of a fixed stop 14, and the second of the two ends thereof being in contact with the third projecting portion 17.3 of the movable bypass stop 17.

A rest position is defined when the second projecting portion 17.2 of the movable bypass stop 17 is in contact with a fixed stop 15 which is connected to the body of the valve.

In the example being considered, the movable bypass stop 17 may be caused to rotate by the bypass wheel 11 when it rotates in the trigonometric direction and via the first projecting portion 17.1, the fixed stop 15 having the effect of, on the one hand, retaining the movable bypass stop in a rest position and, on the other hand, preventing it from being able to be moved in rotation in the inverse trigonometric direction. When it is caused to rotate by the bypass wheel 11, the movable bypass wheel biases the spring 27 by means of the third projecting portion 17.3 thereof. The bypass wheel 11 comprises a drive portion 30 (in this instance, a material bridge which is arranged over a radius of that bypass wheel) of the first projecting portion 17.1 when the bypass wheel rotates in the trigonometric direction from the rest position, and a passive position 31 (in this instance, a recess provided in the wheel at an angular sector) which allows the bypass wheel to rotate in the inverse trigonometric direction from the rest position and in accordance with an angular sector which is at a maximum equal to that of the passive portion, without having any action on the projecting portion 17.1.

In the rest position, the drive portion 30 is in contact with the projecting portion 17.1 of the movable bypass stop 17. From that rest position, when the bypass wheel 11 rotates in the trigonometric direction, the drive portion 30 causes the projecting portion 17.1 to rotate, which results, on the one hand, in one of the ends of the bypass spring 27 being biased via the projecting portion 17.3 and, on the other hand, in the bypass shaft 18 and therefore the bypass valve member 20 being caused to rotate.

From that rest position, when the bypass wheel 11 rotates in the inverse trigonometric direction, the passive portion 31 allows rotation of the bypass wheel about an angle which is at a maximum equal to that of the angular sector of that passive portion.

When the bypass wheel no longer applies any force to the projecting portion 17.1, either owing to a change in the rotation direction in relation to the direction which had the effect of leaving the rest position, or when the bypass wheel becomes free in terms of rotation, following a lack of effort applied by the drive wheel, for example, the bypass spring 27 tends to return to the rest position thereof and one of the ends thereof carries the projecting portion 17.3 until the other projecting portion 17.2 is in contact with the fixed stop 15 with which it was in contact in the rest position.

The bypass valve member 20 is arranged in the common internal space 201. That valve member extends around the shaft 18 over an angular sector θj and along that shaft over a height hj. It is caused to rotate about the shaft 18 and thus moves within the common internal space 201. By being moved, it closes one or other of the conduits 3 and 4.

FIG. 6 illustrates the displacement law of the bypass valve member 20 (line 40) and the metering valve member (line 41), that is to say, the relative development of the angular positioning of those two valve members 20 and 21 in accordance with the control voltage of the direct-current electric motor 8, therefore the rotation of the actuation wheel 10. That displacement law is established by the specific arrangement of:

the bypass wheel 11 and metering wheel 12,
the drive portions 32, 35 and 30,
the passive portions 33 and 31,
the movable bypass stop 13 and metering stop 17,
the bypass torsion spring 27 and metering torsion spring 23,
the fixed stops, whose operation has been described in relation to FIGS. 4 and 5.

The axis of abscisses of each line corresponds to the control voltage of the electric motor. In the absence of any electrical power being supplied to the motor, the valve members 20 and 21 are in a rest state.

The axis of the ordinate of each line 40 and 41 represents the value of the angle which the valve members 20 and 21 take up, respectively, with respect to the rest state thereof. With respect to the rest state, the electric motor is capable of driving the metering valve member 21 with rotation having an extent −α in a first rotation direction and +α in a second rotation direction. With respect to the rest state, the electric motor is further capable of driving the bypass valve member 20 with rotation having an extent 2β in the second rotation direction, that bypass valve member 20 not moving in the first rotation direction of the electric motor.

Figure 7:
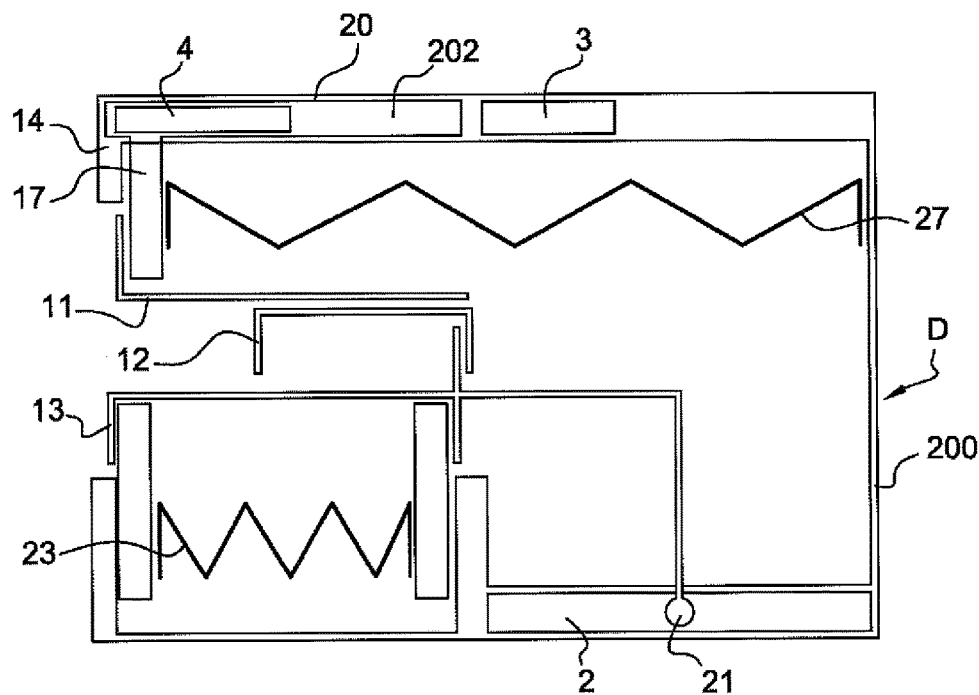
Figure 11:
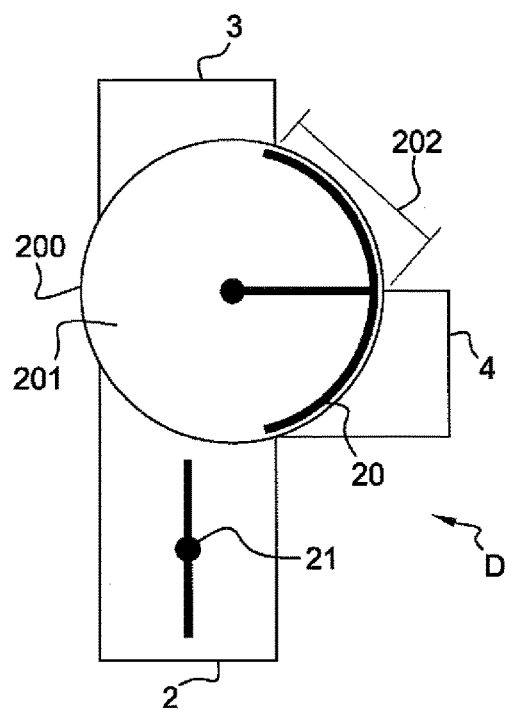

The reference D located between the ranges A and B of the lines 40 and 41 represents the rest state. In that rest state, the position of the valve members 20 and 21 is illustrated in FIGS. 7 and 11. In that state, the metering valve member 21 opens the conduit 2 to a maximum extent and the bypass valve member 20 is in a position in which it completely closes the bypass conduit 4 and opens the conduit 3 to a maximum extent. An angular sector of the bypass valve member straddles the overlap zone 202.

Figure 8:
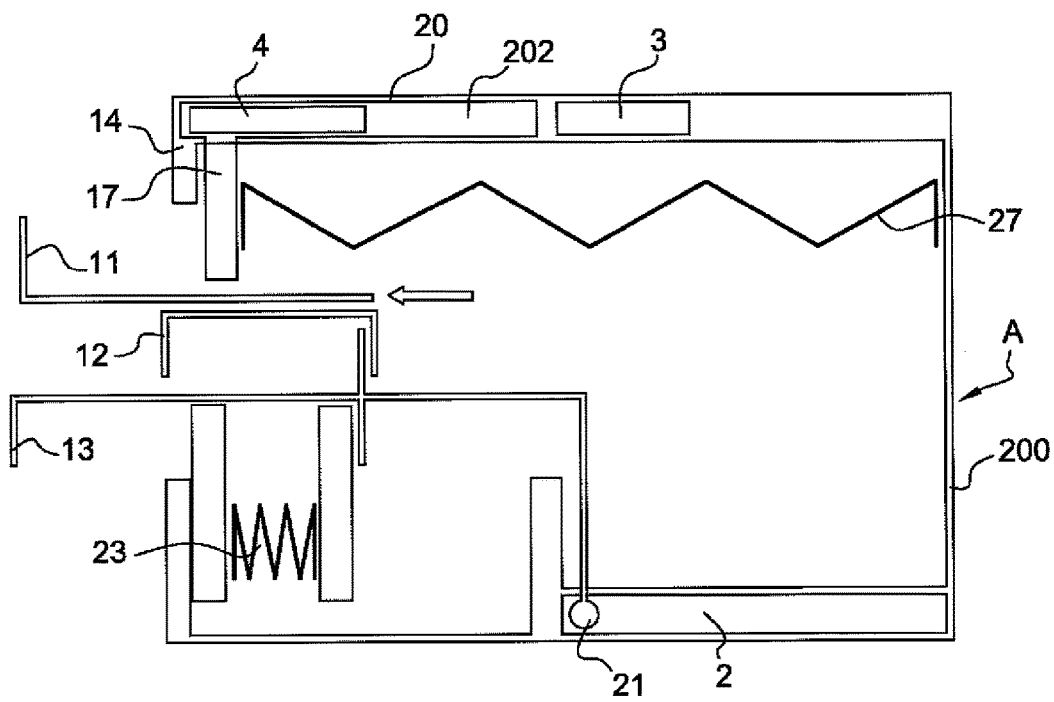
Figure 12:
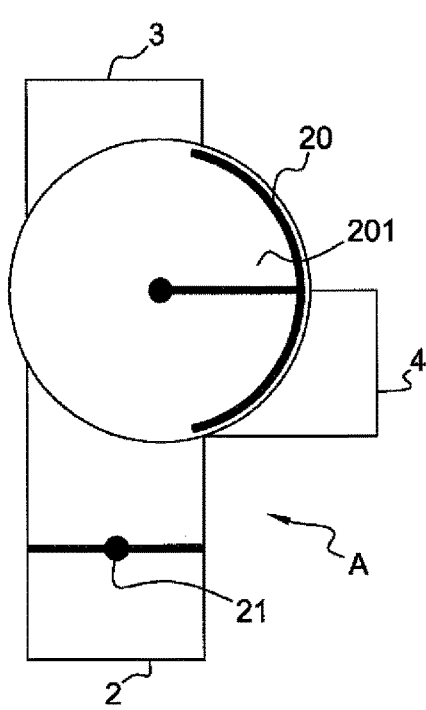

The range A of the lines 40 and 41 corresponds to a metering of the cooled path 3 as will be described with reference to FIGS. 8 and 12. In that range, the motor rotates in a first rotation direction, that is to say, in a direction for which a negative voltage is applied to the actuation control thereof. The bypass and metering wheels carry out a rotation in the opposite direction (one engaging with the other). In the example being considered, the metering wheel rotates in the trigonometric direction and the bypass wheel rotates in the inverse trigonometric direction. In that rotation direction of the metering and bypass wheels and from the rest state as illustrated in FIGS. 7 and 11, the effect of the arrangement of the passive and drive portions of the two actuation wheels and the movements of the movable bypass and metering stops are as described above in relation to FIGS. 4 and 5.

In this manner, in that range A, the bypass wheel 11 does not carry the movable bypass stop 17 which has the effect of not carrying the bypass valve member 20 which remains in the rest state thereof and the metering wheel 12 carries the movable metering stop 13 which has the effect of carrying the metering valve member 21 which closes the conduit 2.

The metering valve member 21 is caused to rotate about an angle which is at a maximum equal to −α in relation to the position thereof in the rest state and the bypass valve member remains in the rest state thereof.

From the rest state, such a rotation of the bypass and metering wheels in the first rotation direction of the motor allows the cooled path 3 to be metered, the rotation of each wheel not extending beyond the angle for which the metering valve member completely closes the cooled path 3, that is to say, when the angle is equal to −α in relation to the position thereof in the rest state.

As described with reference to FIGS. 4 and 5, the metering valve member 21 returns to the rest state thereof under the action of the torsion spring 23 following a rotation in the opposite direction of the electric motor.

Figure 9:
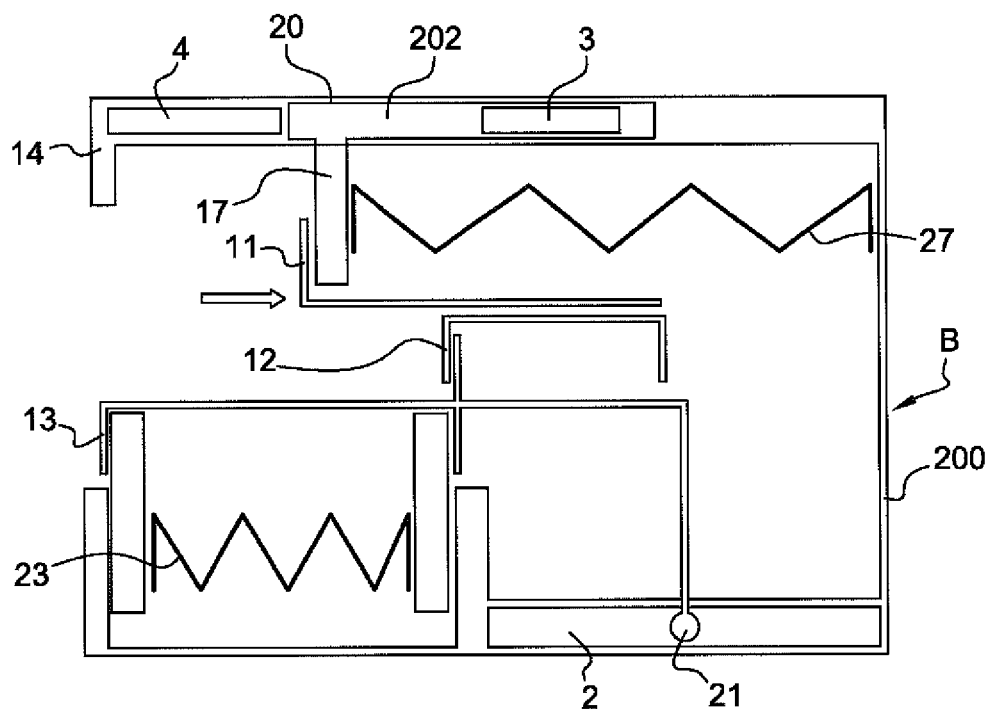
Figure 13:
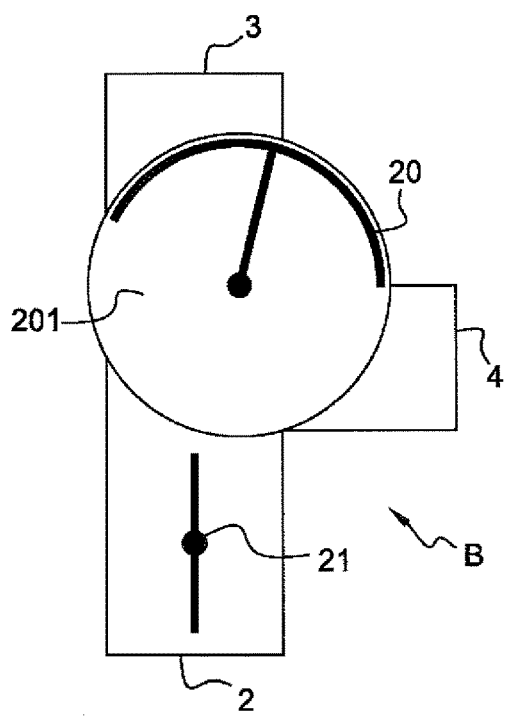

The range B of the lines 40 and 41 corresponds to a selection of the bypass path 4, as illustrated in FIGS. 9 and 13. In that range, the motor rotates in a second rotation direction, that is to say, in a direction for which a positive voltage is applied to the actuation control thereof. In the example being considered, the metering wheel rotates in the inverse trigonometric direction and the bypass wheel rotates in the trigonometric direction. In that rotation direction of the metering and bypass wheels and from the rest state as illustrated in FIGS. 7 and 11, the effect of the arrangement of the passive and drive portions of the two actuation wheels and the movements of the movable bypass and metering stops are as described above in relation to FIGS. 4 and 5.

In this manner, in this range B, the drive portion 30 of the bypass wheel 11 causes the projecting portion 17.1 of the movable bypass stop 17 to rotate, which has the effect of causing the rotation of the bypass valve member 20 which is moved about an angle which is at a maximum equal to β in relation to the position thereof in the rest state and the passive portion 33 of the metering wheel 12 does not carry the movable metering stop 13, which has the effect of not causing the rotation of the metering valve member 21 which remains in the rest position thereof.

At the end of the range B, the bypass valve member forms an angle equal to β in relation to the position thereof in the rest state. In that angular position of the bypass valve member, the metering wheel 12 has carried out a rotation about such an angle that the drive portion 35 is in contact with the projecting portion 13.1 of the movable metering stop 13.

As described with reference to FIGS. 4 and 5, the bypass valve member 20 returns to the rest state thereof, under the effect of the torsion spring 27 following a rotation in the opposite direction of the electric motor.

In the example described, the bypass valve member extends over an angular sector which is generally equal to 2β and the overlap zone 202 generally extends over an angular sector β.

FIG. 13 illustrates the valve at the end of the range B, that is to say, when the bypass valve member has carried out a rotation about an angle β in relation to the position thereof in the rest state (the rest state being illustrated in FIG. 11). By being moved through an angle β in relation to the position thereof in the rest state, the bypass valve member 20 has opened the third conduit 4 and closed the second conduit 3, the angular sector which closed that third conduit being moved along the overlap zone 202, the angular sector which was along the overlap zone being moved in the second conduit 3.

Figure 10:
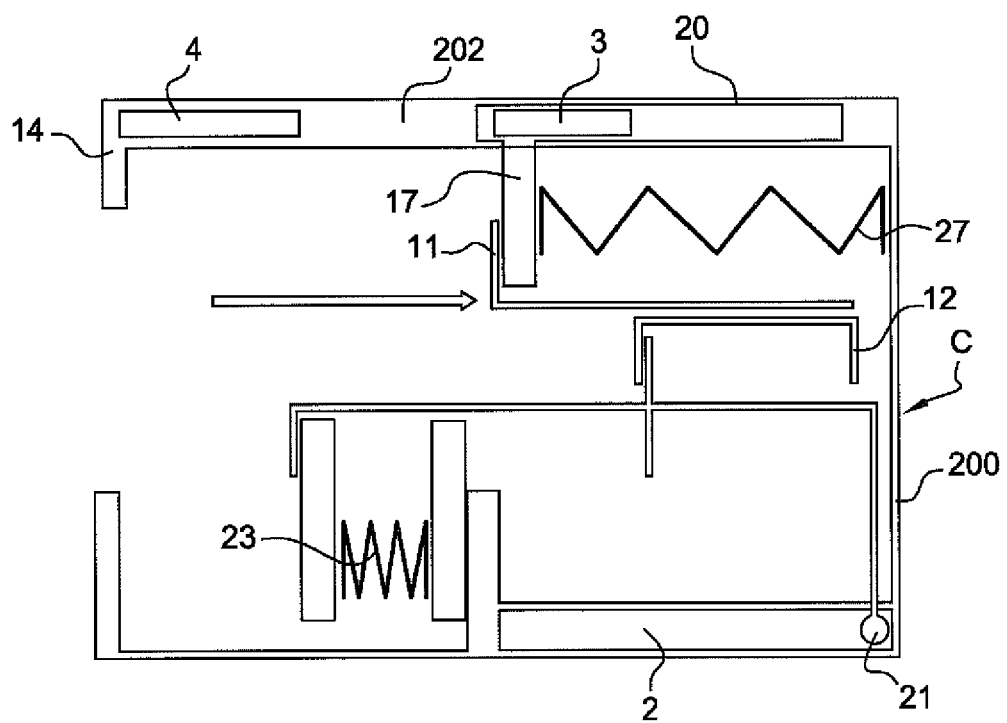

The range C of the lines 40 and 41 corresponds to a metering of the bypass path 4 as will be described with reference to FIGS. 10 and 14. In this range, the motor continues to rotate in the second rotation direction. In this rotation direction of the metering and bypass wheels and from the state of the valve members as illustrated in FIGS. 9 and 13, the effect of the arrangement of the passive and drive portions of the two actuation wheels and the movements of the movable bypass and metering stops are as described above in relation to FIGS. 4 and 5.

In this manner, in this range C, the drive portion 30 of the bypass wheel 11 causes the projecting portion 17.1 of the movable bypass stop 17 to rotate, which has the effect of causing the rotation of the bypass valve member 20 which is moved about an angle which is at a maximum equal to 2β in relation to the position thereof in the rest state, and the drive portion 35 of the metering wheel 12 carries the projecting portion 13.1 of the movable metering stop 13, which has the effect of causing the rotation of the metering valve member 21 which closes the conduit 2, that is to say, when it has an angle equal to +α in relation to the position thereof in the rest state.

As described with reference to FIGS. 4 and 5, the bypass valve member 20 returns to the rest state thereof under the action of the torsion spring 27 following a rotation of the electric motor in the opposite direction and the metering valve member 21 returns to the rest state thereof, under the action of the torsion spring 23 following a rotation of the electric motor in the opposite direction.

Figure 14:
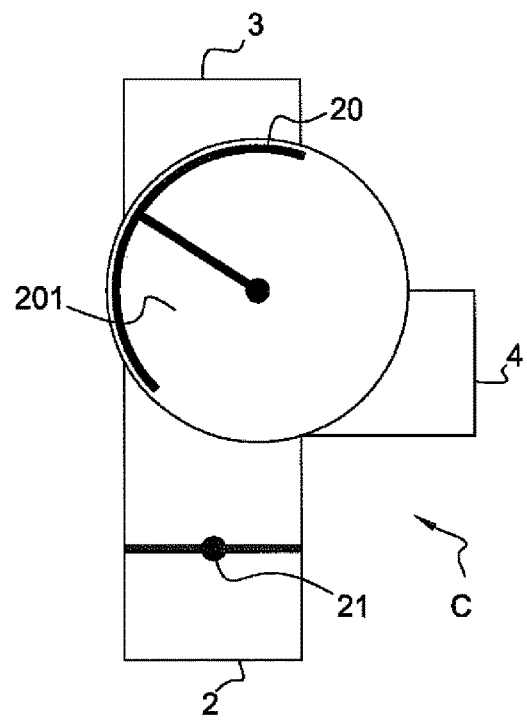

FIG. 14 illustrates the valve at the end of the range C, that is to say, when the bypass valve member has carried out a rotation through an angle in relation to the position thereof at the end of the range B. By being moved through an angle β in relation to the position thereof at the end of the range B, the bypass valve member 20 has not modified the opening cross-section of the conduits 3 and 4. The angular sector of the bypass valve member which was along the overlap zone has moved in the second conduit 3.

The invention is not limited to the examples which have been described. It may, for example, be used at an outlet of the cooled path of a low-pressure EGR architecture. It may also be used in the case of a high-pressure EGR architecture. It may also be used in valves which are intended for applications other than air intake circuits.

The invention claimed is:

1. A three-way valve for an air intake circuit of a motor vehicle, comprising:
    a body delimiting a first conduit, second conduit and third conduit, the conduits opening in a common internal space;
    a first valve member which is capable of being moved in order to close the first conduit;
    a second valve member which is capable of being moved in order to selectively close one or other of the second and third conduits;
    a single actuator which is arranged in order to selectively move at least one of the first and second valve members;
    a first transmission wheel, which is arranged in order to carry the first valve member; and
    a second transmission wheel, which is arranged in order to carry the second valve member,
    wherein the actuator comprises an actuation wheel that is arranged in order to directly engage one of the first and second transmission wheels and indirectly engage the other of the first and second transmission wheels, such that either the actuation wheel directly engages the first transmission wheel and the first transmission wheel directly engages the second transmission wheel, or the actuation wheel directly engages the second transmission wheel and the second transmission wheel directly engages the first transmission wheel,
    the actuation wheel being arranged in order to directly engage the second transmission wheel and to indirectly engage the first transmission wheel via at least the second transmission wheel,
    the valve being configured so that:
        from a rest state of the first and second valve members, a rotation in a first rotation direction of the actuation wheel brings about a movement of the first valve member without moving the second valve member; and
        from the rest state of the first and second valve members, a rotation in a second rotation direction of the actuation wheel, counter to the first rotation direction, brings about a movement of the second valve member in accordance with a first step without moving the first valve member.

2. The valve as claimed in claim 1, wherein the actuator is a direct-current electric motor.

3. The valve as claimed in claim 1, being configured so that the continuation of the rotation in the second rotation direction of the actuation wheel brings about a movement of the first valve member and the second valve member in accordance with a second subsequent step without the movement of the second valve member modifying the flow in the second conduit and third conduit.

4. The valve as claimed in claim 3, being configured so that the second subsequent step begins when the second valve member has reached a position in which it closes one of the second and third conduits.

5. The valve as claimed in claim 3, the second valve member having a closure cross-section which is greater than the cross-section of flow in the second or third conduit in the region of the common internal space.

6. The three-way valve as claimed in claim 1,
    wherein at least one of the first valve member and the second valve member is/are fixedly joined to a shaft, the shaft being provided with a movable stop which is capable of being carried:
        by the first corresponding transmission wheel or second corresponding transmission wheel which is mounted so as to be free about the shaft, and
        by a return member.

7. The valve as claimed in claim 6, wherein one of the first and second transmission wheels is arranged in order to carry the movable stop only over a portion of the rotation thereof.

8. The valve as claimed in either of claim 6, wherein the return member is a torsion spring which is mounted around the shaft and which is biased by the two ends thereof, at least at one side by the body and at the other side by the movable stop.

9. The valve as claimed in claim 6, wherein at least one of the two shafts is provided with a position sensor.

10. The valve as claimed in claim 9, wherein the shaft on which the first transmission wheel is mounted so as to be free is provided with a position sensor.

* * * * *